Oct. 18, 1932.  H. R. BRAND  1,883,516
AUTOMATIC SALES SYSTEM
Filed May 21, 1928  11 Sheets-Sheet 1
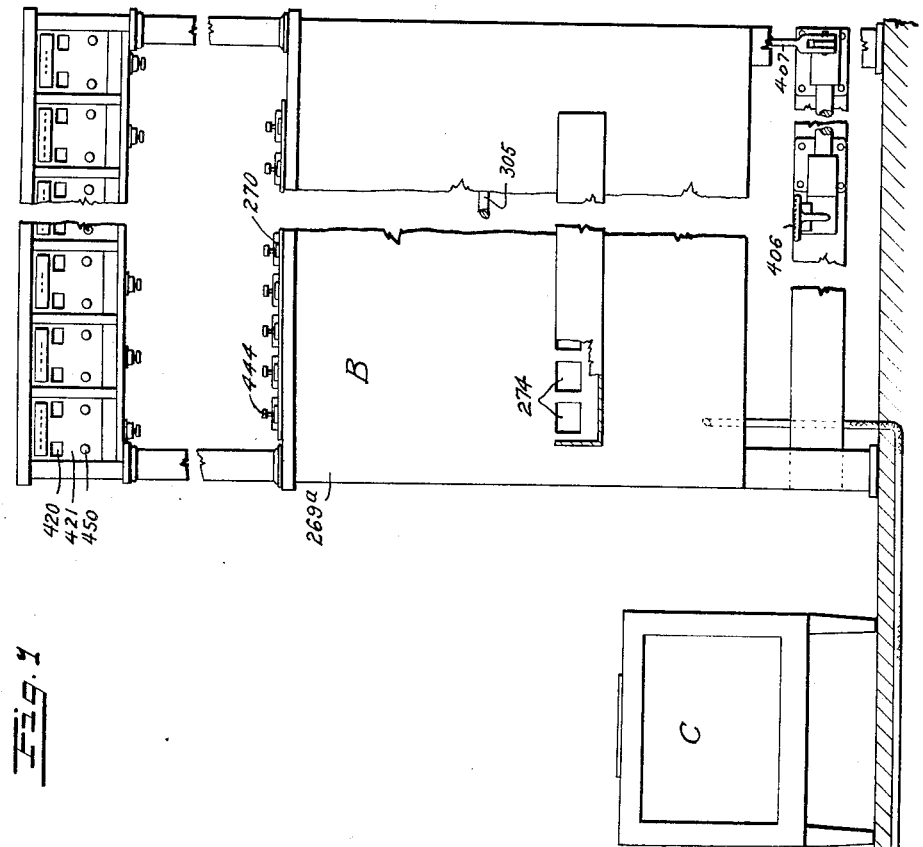
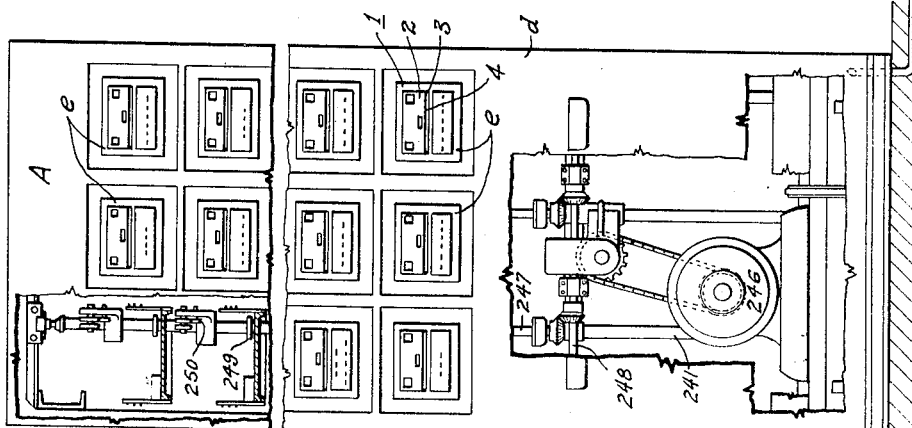
INVENTOR.
Harry R. Brand
BY
ATTORNEY Oct. 18, 1932.  H. R. BRAND  1,883,516
AUTOMATIC SALES SYSTEM
Filed May 21, 1928   11 Sheets-Sheet 2
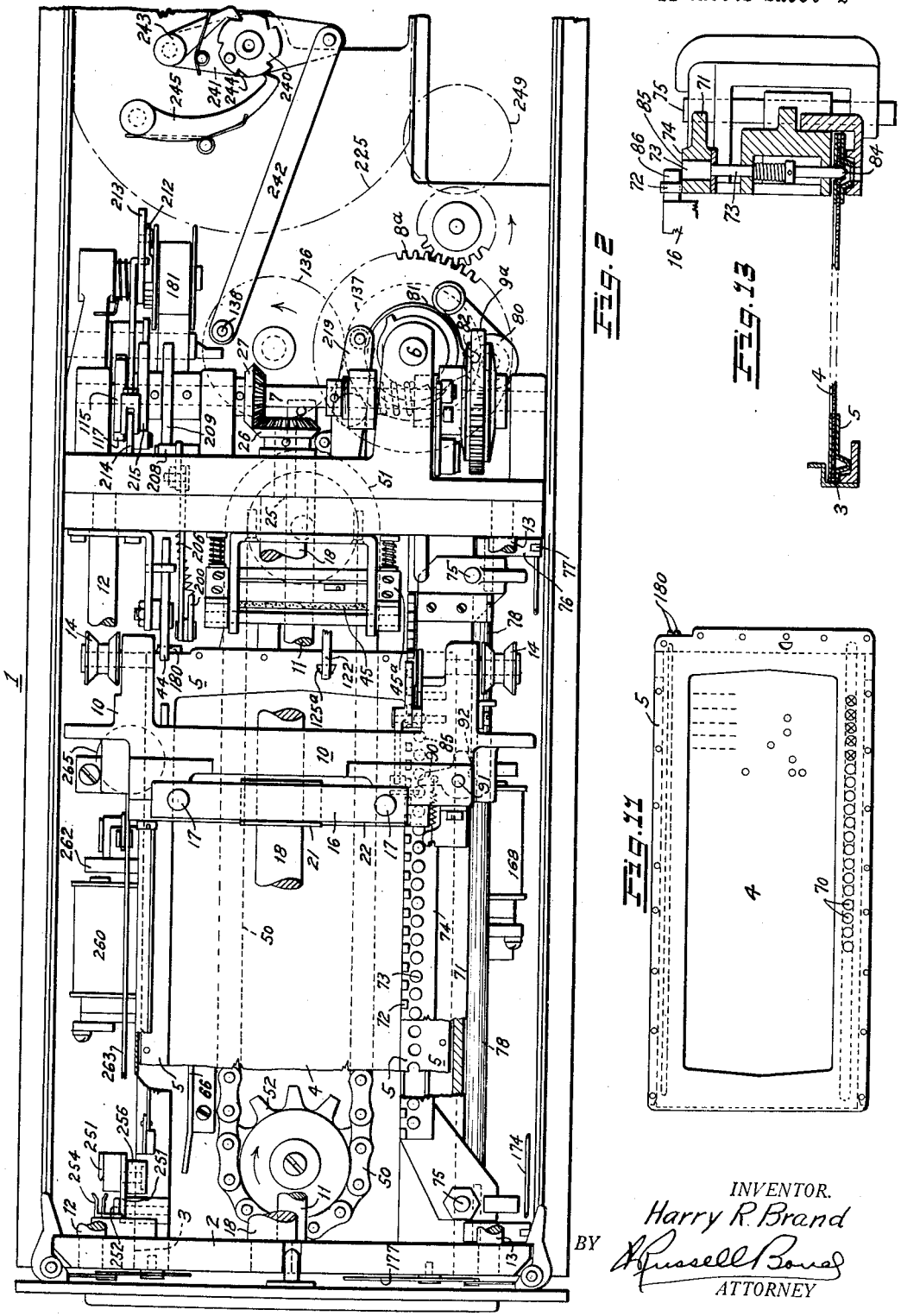
INVENTOR.
Harry R. Brand
BY
ATTORNEY Oct. 18, 1932.  H. R. BRAND  1,883,516
AUTOMATIC SALES SYSTEM
Filed May 21, 1928    11 Sheets-Sheet 3

INVENTOR.
Harry R. Brand
BY
ATTORNEY

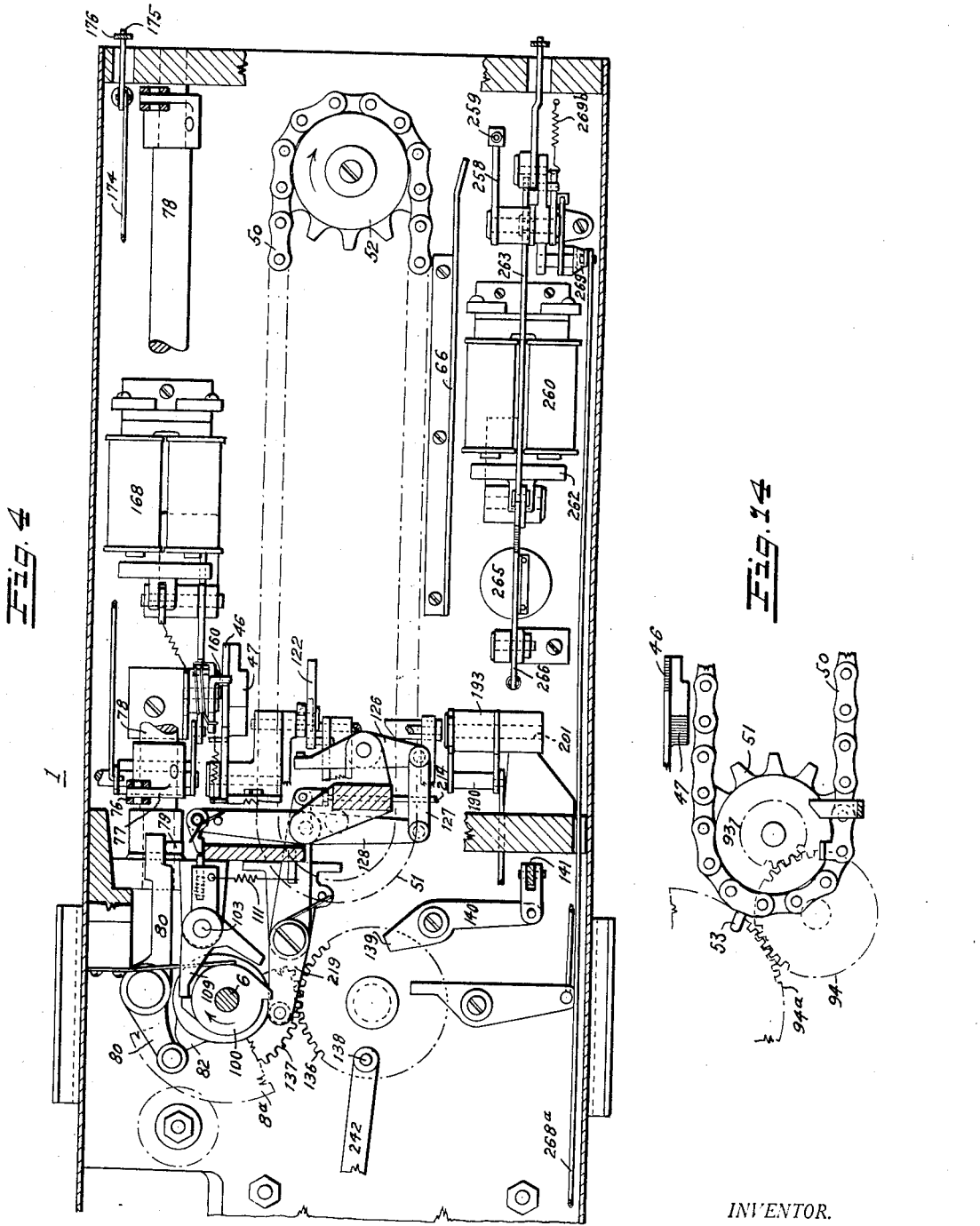

Oct. 18, 1932.  H. R. BRAND  1,883,516
AUTOMATIC SALES SYSTEM
Filed May 21, 1928     11 Sheets-Sheet 5
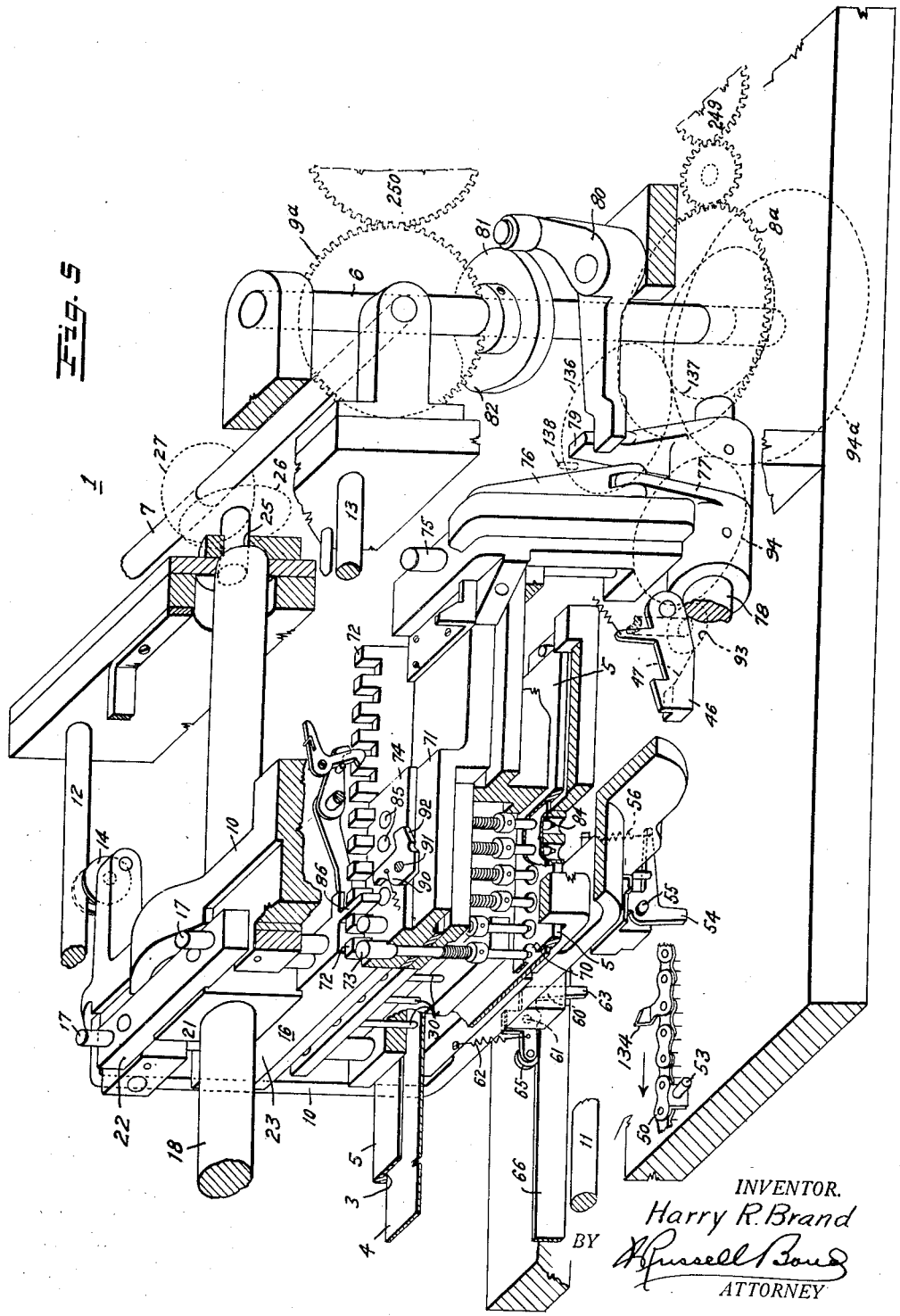
INVENTOR.
Harry R. Brand
BY
ATTORNEY

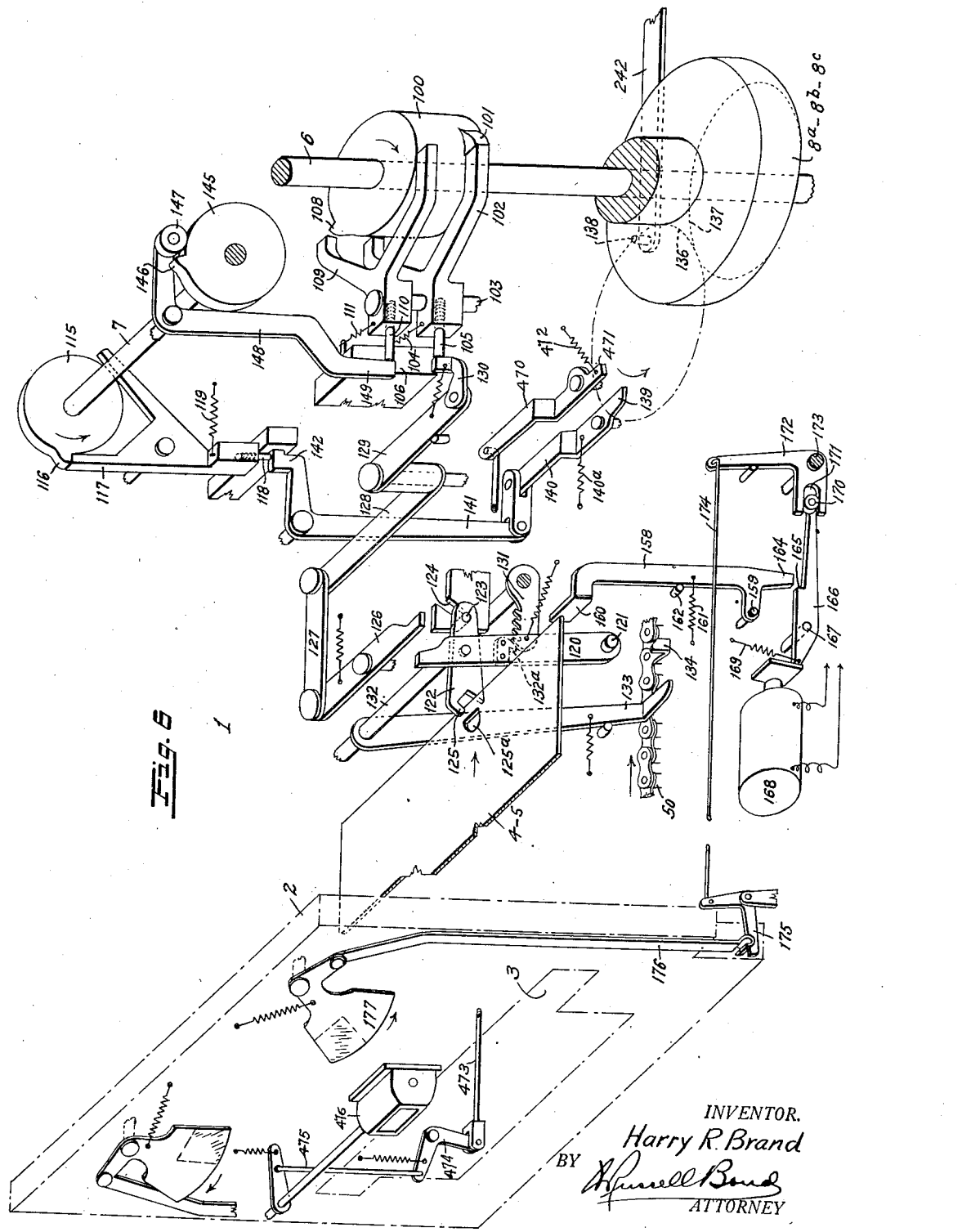

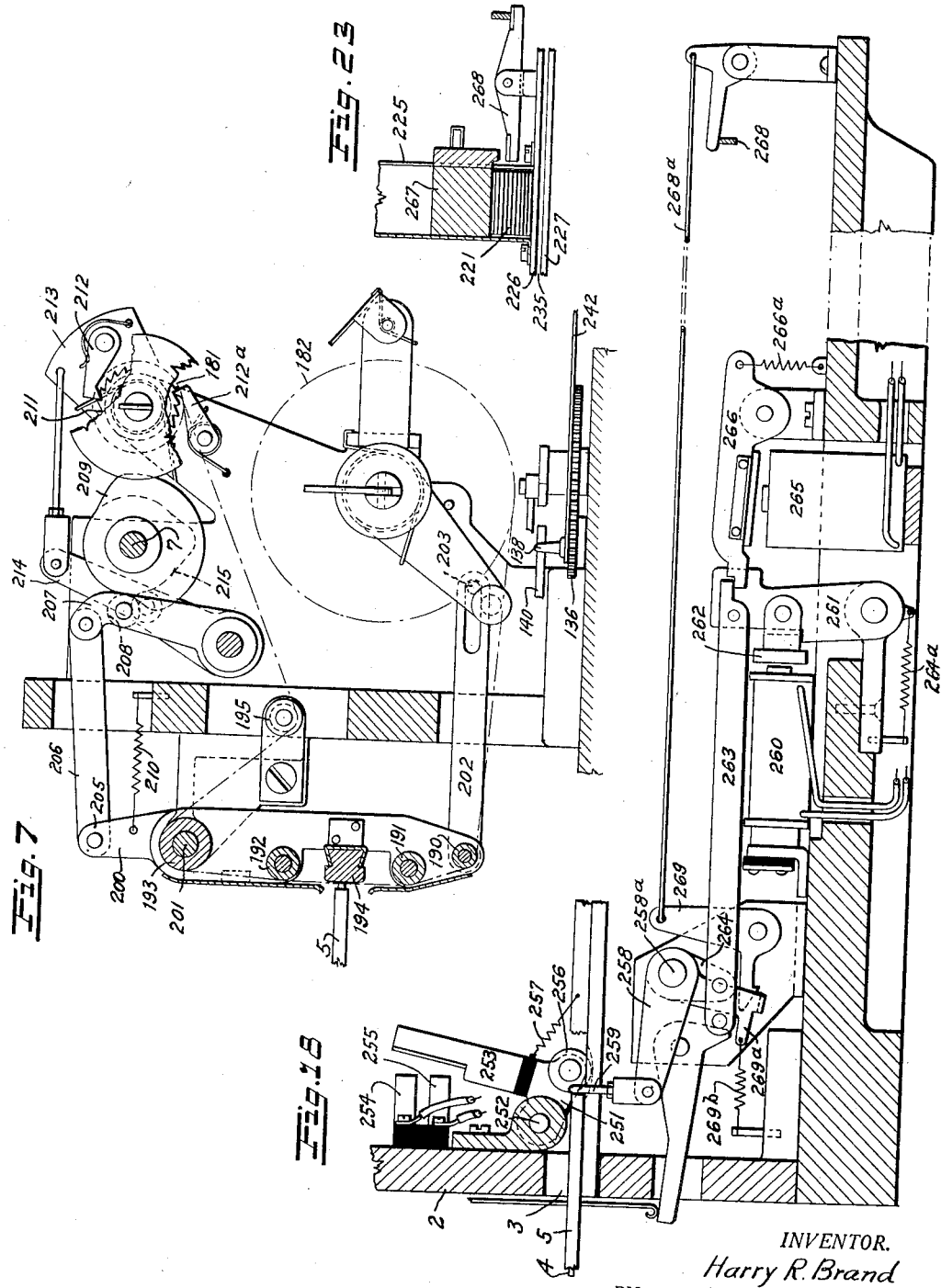

Oct. 18, 1932.  H. R. BRAND  1,883,516
AUTOMATIC SALES SYSTEM
Filed May 21, 1928   11 Sheets-Sheet 8
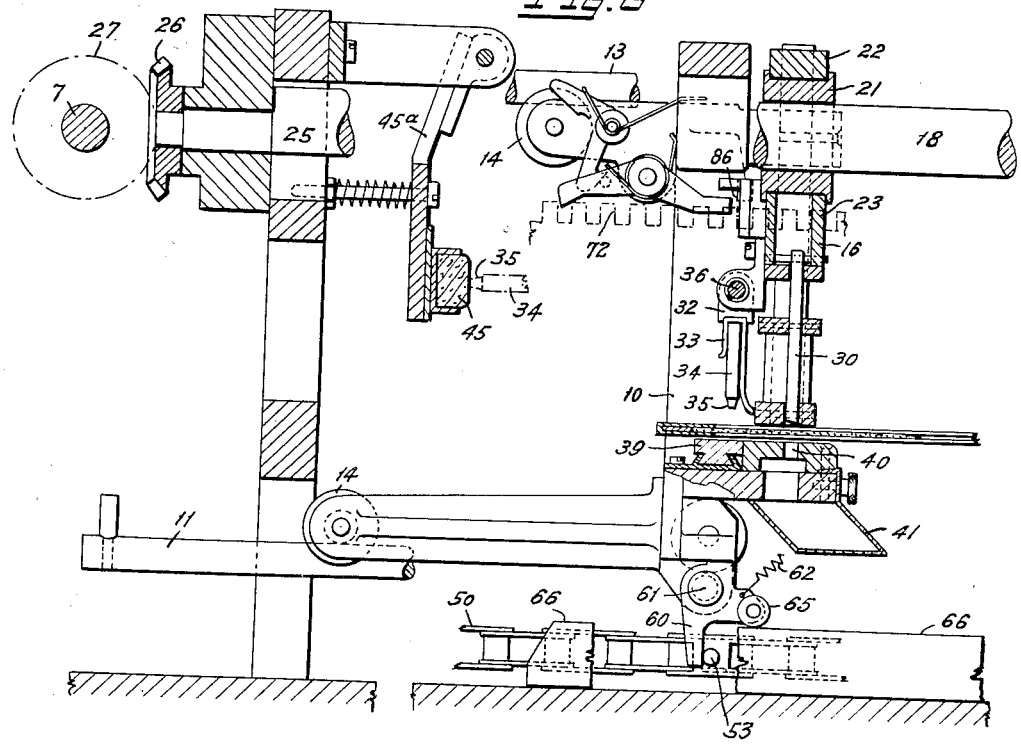
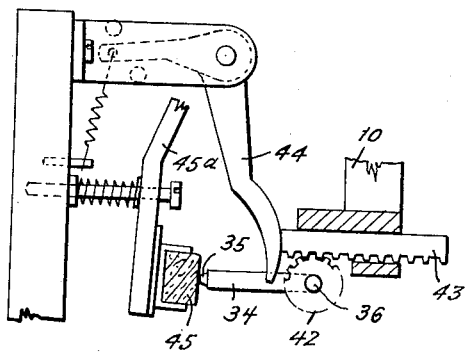
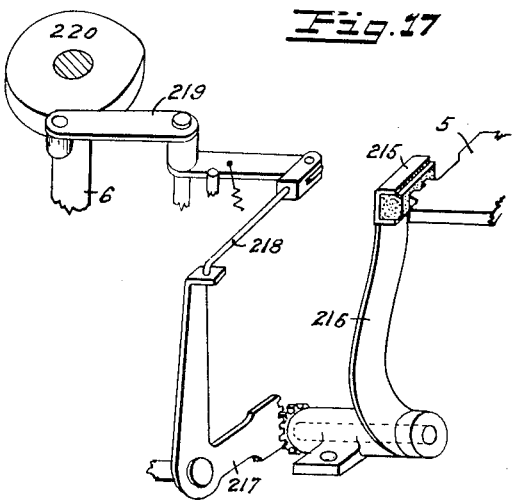
INVENTOR.
Harry R. Brand
BY
ATTORNEY Oct. 18, 1932.   H. R. BRAND   1,883,516
AUTOMATIC SALES SYSTEM
Filed May 21, 1928   11 Sheets-Sheet 9
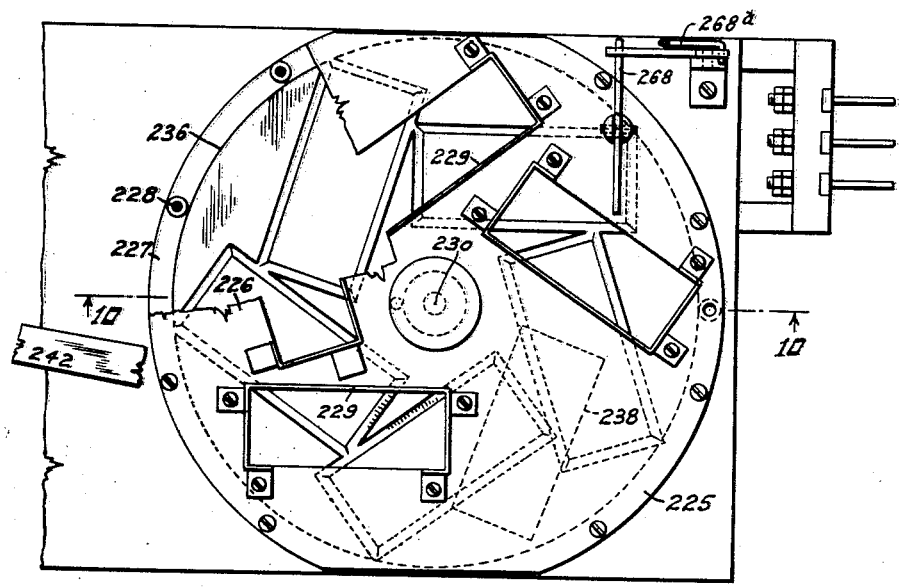
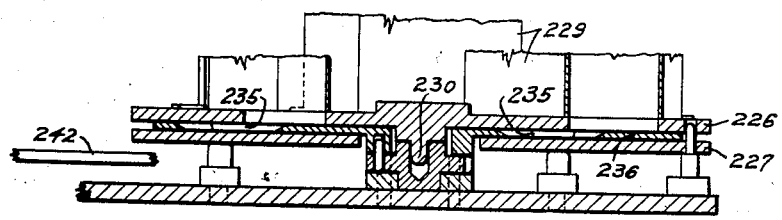
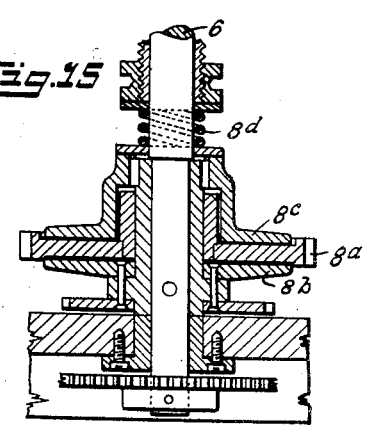
INVENTOR.
Harry R. Brand
BY
ATTORNEY

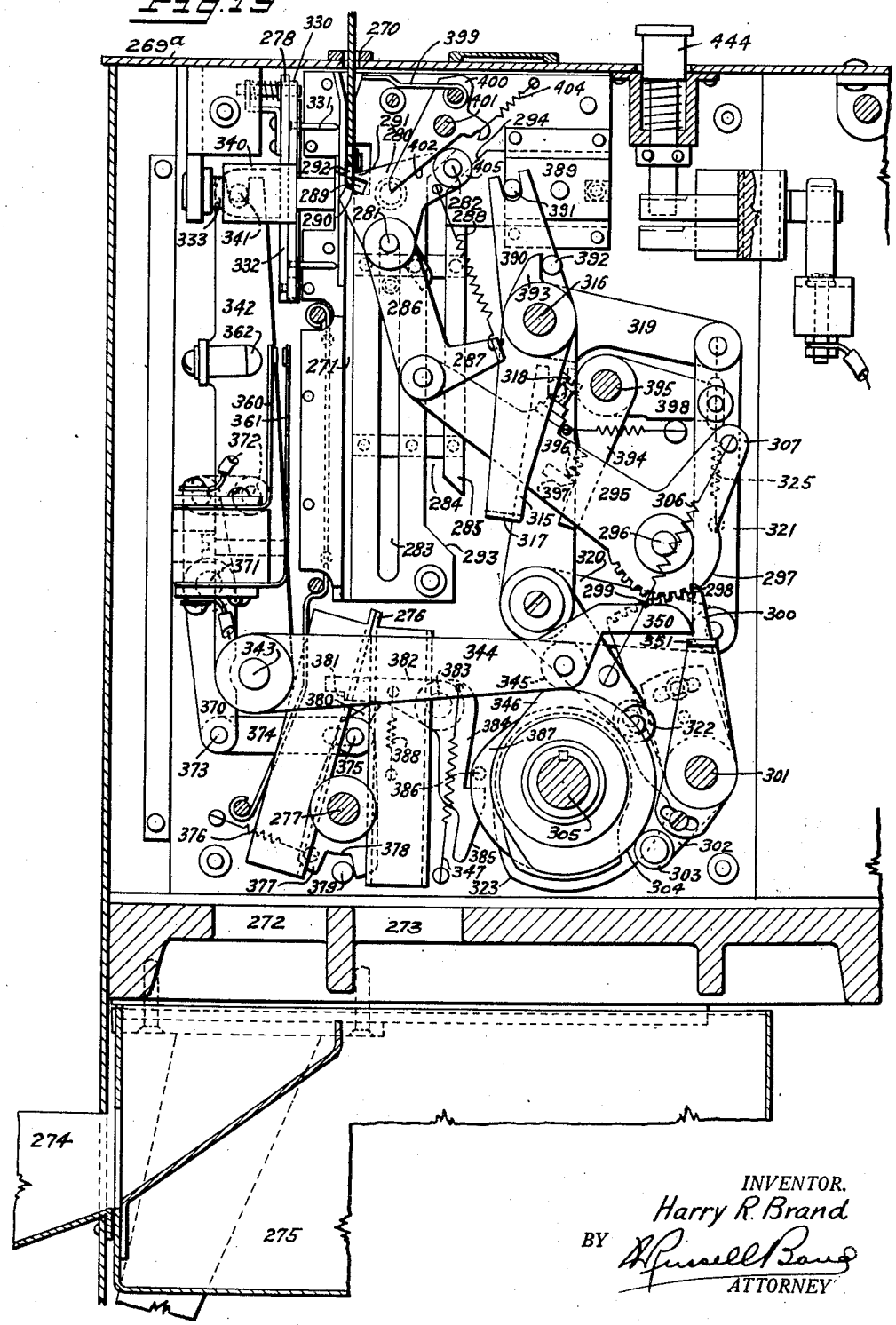

Oct. 18, 1932.  H. R. BRAND  1,883,516
AUTOMATIC SALES SYSTEM
Filed May 21, 1928   11 Sheets-Sheet 11
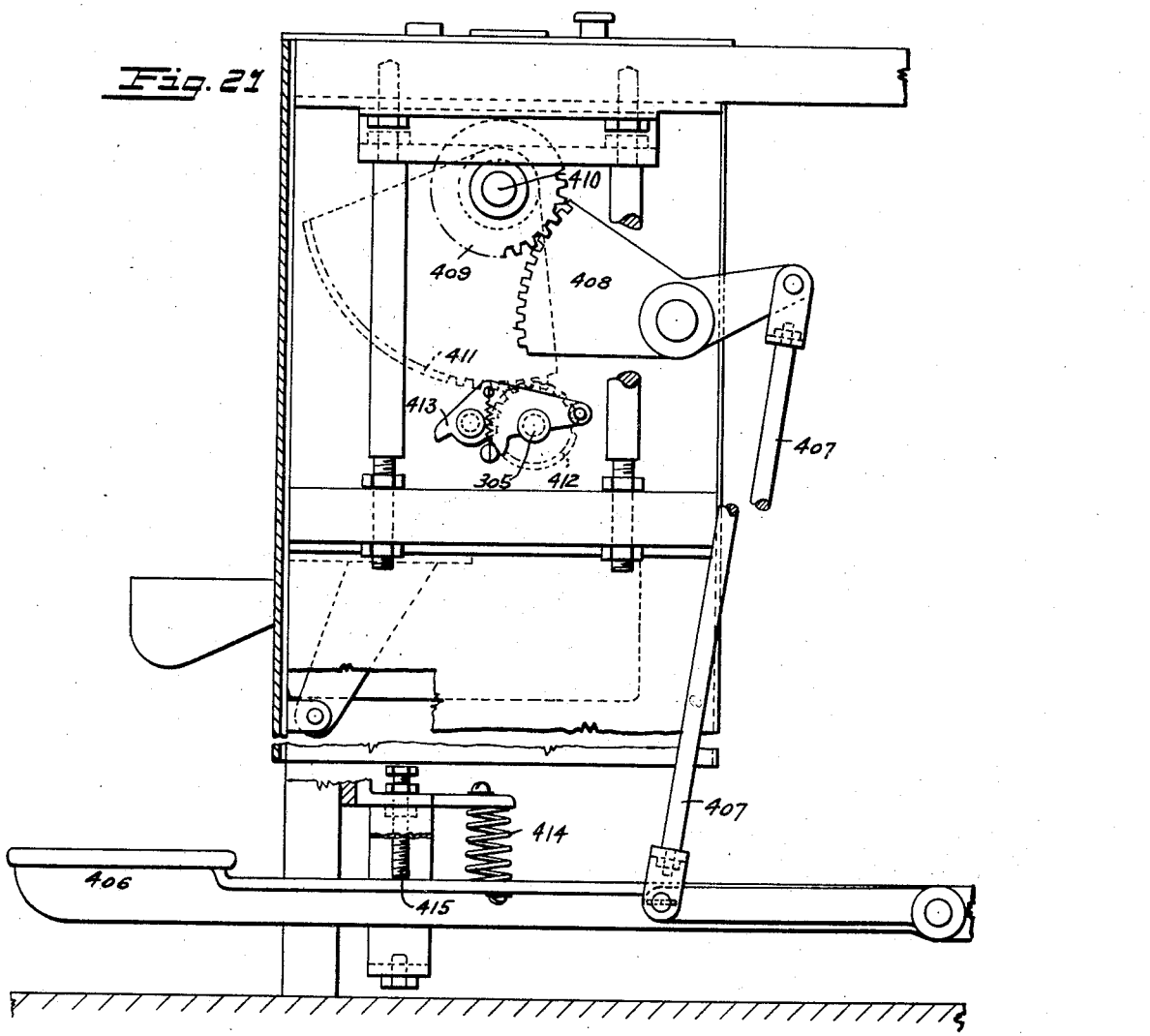
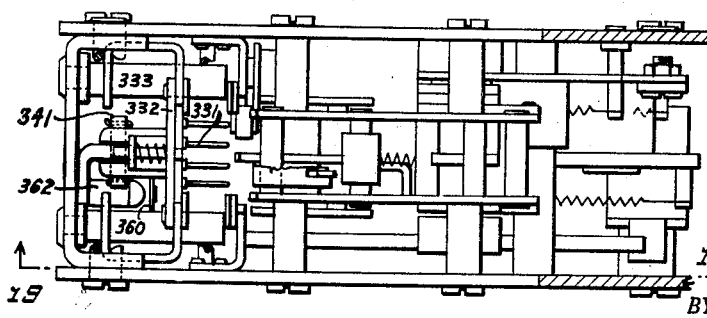
INVENTOR.
Harry R. Brand
BY
ATTORNEY Patented Oct. 18, 1932

1,883,516

UNITED STATES PATENT OFFICE

HARRY RUSSELL BRAND, OF NEW YORK, N. Y.

AUTOMATIC SALES SYSTEM

Application filed May 21, 1928. Serial No. 279,551.

This invention relates to automatic sales systems and with regard to more specific features to systems for dispensing articles prepared to order.

It is an object of this invention to provide a system of the character described by which an article may be prepared on order and may be dispensed, with complete control to insure that the article dispensed shall be in accordance with the order and that it shall be delivered to the proper recipient.

It is a further object of this invention to provide a system of the character described which will facilitate the sales transaction so that it may be made more rapid and efficient and free from error.

It is a further object to provide a system of the character described which will insure such a check upon the personnel that it will be definitely ascertained whether or not full payment has been received for every article ordered.

It is a further object to provide a system of the character described in accordance with which the service to the customer will be materially improved by insuring that the bill submitted to him shall be legible and clear and free from error.

It is a further object to produce a system of the character described in accordance with which the necessary dispensing operation may be conducted with a minimum of labor and a maximum of efficiency.

Other objects will be in part obvious and will be in part pointed out hereinafter.

The system comprises in general means for performing one of the necessary dispensing acts automatically and for so controlling the operation of that act that a complete control is effected over the entire dispensing transaction. In the embodiment of the invention herein illustrated the ordering of the article is adopted as the act to be performed mechanically. This insures the proper initiation of the transaction and facilitates the proper control over all subsequent portions thereof.

The mechanism herein illustrated for carrying out the invention, therefore, comprises primarily a means for automatically ordering an article, or a series of articles together with the necessary mechanism for co-relating that order with the delivery and with the payment for the articles, to insure that the payment accurately corresponds to the order.

The particular embodiment of the invention herein illustrated is intended primarily for the dispensing of articles of food in a high class restaurant where the food is prepared on order and is served by waiters at individual tables. In such a system the waiter finally presents to the guest a check for payment which check has listed thereon the items for which the guest is asked to pay.

It is an object of this invention, therefore, to perform not only the ordering step automatically but to simultaneously therewith print upon the check, item after item, the articles ordered and the amounts to be charged therefor, to insure that the check and the payment correspond to the order.

Moreover, since the ordering of an article initiates the preparation thereof and identifies the person thus ordering, for subsequent delivery of the article to him, means are provided in the mechanism herein illustrated for making a record of the person giving the order, in order that responsibility for the orders may be secured.

Means are also provided in the mechanism herein illustrated for insuring that the total charged the guest shall be the true total of the items delivered and to this end means are provided for automatically totaling and printing upon the check the sum of the items ordered as they appear thereon.

The mechanism also involves means for placing the order before the proper cook or server in such form that the cook may acknowledge the order at the time of receipt while at the same time retaining the record of the number of orders to be served up to and until they are actually served and in accordance with which a record is automatically kept of the number of orders served whereby control is effected over the service.

The machine herein particularly illustrated for carrying out the invention, therefore, may be generally divided into three parts (see Fig. 1), one of which performs those functions which are specifically to be performed at the ordering station and another of which performs those functions which are to be specifically performed at the serving station and the third ascertains the sales totals to be paid. The invention herein illustrated comprises the system performed by the co-joint use of these machines. The machines themselves are separately the subject matter of other patent applications, the ordering mechanism being specifically described and claimed more in detail in my copending application Serial #527,516, Filed Jan. 6, 1922 (now Patent No. 1,672,362, issued June 5, 1928) and the serving machine being similarly illustrated in my copending application Serial #548,250 filed Mar. 30, 1922 (now Patent No. 1,803,522, issued May 5, 1931) and the totalizer in my copending application Serial #562.229 filed May 19, 1922 (now Patent No. 1,825,141, issued September 29, 1931).

The invention accordingly comprises the several steps and the relation and order of one or more of such steps with respect to each of the others, and the apparatus embodying features of construction, combinations of elements and arrangements of parts which are adapated to effect such steps, all as exemplified in the following detailed disclosure, and the scope of the application of which will be indicated in the claims. For a fuller understanding of the nature and objects of the invention, reference should be had to the following detailed description taken in connection with the accompanying drawings,—in which:—

Figure 1 is a diagrammatic illustration of an installation capable of carrying out this invention.

Figure 2 is a top plan view of one of the units comprising the ordering mechanism.

Figure 4 is a section along the line 4—4 of Figure 3.

Figure 5 is a perspective view showing the relationship of the card receiving, printing, and punching mechanisms.

Figure 6 is a diagrammatic perspective showing the relationship of the two driving shafts and their control mechanism.

Figure 7 is a detail showing the mechanism for making a permanent record within the ordering machine of the person responsible for the order.

Figure 8 is a detail showing the card punching and printing mechanism and related parts.

Figure 9 is a top plan detail of the token ejecting mechanism.

Figure 10 is a sectional detail, on the line 10—10 of Fig. 9.

Figure 11 is a plan of a type of metallic frame adapted for use in the system.

Figure 12 is a plan of a type of token which may be employed.

Figure 13 is a detail of the printed positioning mechanism.

Figure 14 is a detail of the carriage control mechanism.

Figure 15 is a detail of the type of clutch which may be employed in the drive mechanism.

Figure 16 is a detail of the means by which the type for printing the menu may be inked.

Figure 17 is a detail of the mechanism by which the type upon the frame may be inked for printing upon a tape.

Figure 18 is a detail of various control mechanisms whereby the machine is interrelated with other machines.

Figure 19 is a diagrammatic section through the token selecting machine showing operating mechanism therefor, this section being taken on the line 19,—19 of Figure 20.

Figure 20 is a sectional top plan view of the mechanism shown in Figure 19.

Figure 21 is a side elevation of a foot power operating means for the token selecting mechanism.

Figure 23 is a detail.

Figure 3:
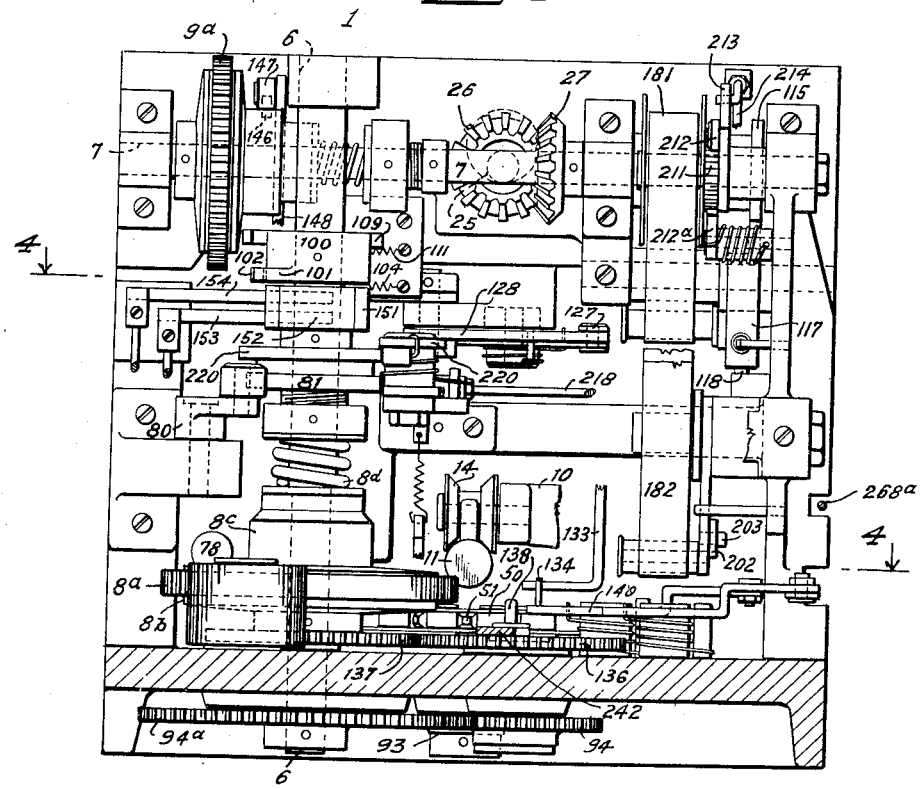
Figure 3 is a rear view of the same.

As will be seen from Figure 1 the system when carried out as herein exemplified thus includes an ordering machine A,—a dispenser B and a totalizer C. These may be described in that order.

The ordering mechanism A (see Fig. 1) comprises a frame "d" carrying a plurality of ordering machines "e",—one being provided for each commodity ordered. These are identical in construction and interchangeable as fully described in my copending application.

Each ordering machine 1 (see Figures 2, 3, 4, 5 and 6) comprises a casing 2 having a slot 3 into which a card 4 may be inserted which card is to form the customers' sales check. This card 4 may preferably be inclosed in a metallic frame 5 (Fig. 11) which not only protects the card from injury but at the same time assists in the control of the machine as will hereinafter more fully appear. This frame is of a size and shape to fit within the slot 3 and when so inserted, to engage the mechanism within the casing to start the operation of the machine.

The operation of this machine comprises among other things the printing upon the check of the item and the punching of the check with perforations corresponding to the price of the item, for subsequent mechanical totaling. Since the sales check, however, is to serve for the customer's entire order and the items are printed thereon successively, means are provided for bringing the printing mechanism into alinement with the next available unprinted space upon the card.

The cycle of operation may therefore be considered in three parts, first the bringing of the printing mechanism to the next printing position, second the operation of the printing and punching mechanism and third the restoring of the printing mechanism to normal. In the machine illustrated, the first three steps are brought about through the successive operation of a vertical shaft 6 while the operation of the printing mechanism is controlled by a horizontal shaft 7 (see Figs. 2, 3, 4 and 5). Each of these shafts is frictionally connected with a continuously operated gear 8a—9a, (Fig. 3) and each is restrained from rotation by a stop (Fig. 6),—whereby each will rotate as soon as released. Since these clutches are alike and since their construction forms no part of the present invention, a brief outline of the construction will be sufficient (see Fig. 15).

A gear 8a is journaled about the shaft 6 and rests between two annular discs 8b and 8c one of which is fast upon the shaft and the other keyed to it. A spring 8d causes these discs to grip the gear between them.

The printing and the punching mechanism are mounted upon a carriage 10 (see particularly Fig. 5) carried between a guide rod 11 at the bottom of the carriage and a pair of guide rods 12 and 13 at the upper portion thereof. Anti-friction rollers 14 are employed to permit the carriage to slide upon the guide rods with a minimum of effort. This carriage has a head 16 vertically slidable upon rods 17 upon the carriage which head carries the printing and punching mechanism, as will be hereinafter described.

The head is vertically moved by a shaft 18 (see Figs. 2, 3, 4 and 5) extending parallel to the guide rods 11 and 12 and passing through a block 21 upon the head 16 which block is held between guides 22 and 23 to permit lateral but not vertical movement with respect to the head. The shaft 18 is mounted eccentrically as shown at 25 and is rotated by a bevel gear 26 meshing with a bevel gear 27 upon the shaft 7. These bevel gears 26 and 27 are of the same size, whereby a single rotation of the shaft 7 will cause a complete rotation of the shaft 18 to cause a complete printing and punching operation. Thus as the shaft is rotated about its eccentric axis it causes a lateral sliding of the block 21 in its guides and a vertical movement of the head 16 upon the guide rods 17 to effect the printing and punching operation.

The head 16 carries a plurality of pins 30 which are arranged in a group formation adapted subsequently to operate a totalizer by an amount corresponding to the price of the item for which the machine is set. Mounted upon the head 16 is a bracket 32 carrying a clamp 33 adapted to retain a metallic slug 34 having upon its lower face 35, a line of type adapted to print the name and price of the commodity. This bracket 32 is pivoted as at 36 so that the slug may hang vertically downward or be moved to a horizontal position for a purpose to be described. The carriage 10 has a platen 39 in position to bear against the underface of the card and a female die 40 positioned to operate with the pins 30 to perforate the card and the arrangement of the parts is such that as the head 16 is caused to descend by the shaft 18, the pins 30 will perforate the card in a manner characteristic of the price of the item ordered and the slug 34 will print the item upon the bill of fare. A receptacle 41 extends below the female die to receive the refuse from the punching.

The bracket 32 carries a pinion 42 meshing with a rack bar 43 adapted to project from the head. A spring pressed arm 44 carried by the frame, is in position to engage the end of the bar 43 to rotate the slug 34 to horizontal position.

An inking pad 45 is resiliently held by a pivoted arm 45a in position to engage the type face 35 when the slug 34 is in horizontal position.

This construction is such as to bring the bar 43 into engagement with the arm 44 to raise the slug and bring the type thereon into engagement with the inking pad.

A latch 46 pivoted to the frame engages the carriage 10 to restrain the movement of the carriage 10. This latch is spring pressed into locking position and has a cam face 47 engageable by a lug 53 upon an endless chain 50 to be later described whereby the lug engages the cam at the beginning of the movement of the chain to unlock the carriage for movement.

The mechanism for moving the carriage to the point upon the sales check corresponding to the next available line is as follows:—

An endless chain 50 (see Fig. 4) is carried upon two sprockets 51 and 52, arranged at the front and back of the lower portion of the machine, one of which 51 is driven from the vertical shaft 6 in a manner to be hereinafter described more in detail. The chain 50 carries a lug 53 upon its exterior which is movable into the pathway of a detent 54, which is pivoted to the carriage as at 55 and held in position by a spring 56. As the chain is moved, therefore, in the direction of the arrow as shown in Figure 5, it will be clear that the lug 53 encountering the detent 54 will move the carriage forward until it meets with some obstruction. Thereupon the continued movement of the lug 53 will rotate the detent 54 against the action of the spring 56 and the lug will pass out from under the detent and leave the carriage in position.

On the other side of the carriage is a detent 60 pivoted at 61 and controlled by a spring 62 having an arm 63 in position to be engaged by the lug 53 as it returns upon the other stretch of the chain. The detent 60 carries a roller 65 riding upon a track 66 to prevent the detent 60 from being prematurely rotated about its pivot by the lug 53.

This track 66, however, terminates at a point to permit this rotation when the carriage has been completely retracted, at which time the lug 53 passes out from beneath the detent 60 and returns to its original position of rest.

The means for determining the position of the carriage to cause the item to be printed upon the next available line on the bill is as follows (see Figs. 5 and 13) :—

The metal frame 5 has a series of perforations 70 (Figs. 11, 5 and 13) spaced apart a distance corresponding to the distance between successive items upon the bill. There extends lengthwise of the ordering machine, a frame 71 having notches 72 spaced apart the distance between successive items and a plurality of pins 73 are slidably mounted for vertical movement within the frame 71 one pin being opposite each notch. The frame 71 has an upper surface 74. The frame 71 is so situated that when the metallic frame 5 carrying a card is inserted into the slot 3, one of the pins 73 will be in register with each of the perforations 70 of the frame 5.

The frame 71 is slidable vertically upon guide pins 75 for a limited vertical movement toward and from the metal frame 5 and this movement is effected by toggle arms 76 and 77. The arm 77 is carried by a shaft 78 which is operated by an arm 79 which is engaged by a bell crank lever 80 operated by a cam 81 upon the vertical shaft 6. This cam 81 has a projection 82 designed to engage the bell crank lever 80 to straighten the toggle 76—77 to raise the frame 71, and the cam is so timed as to cause the frame 71 to be raised at the completion of the cycle of operations and to fall again immediately as soon as the next cycle of operations is commenced.

The pins 73 are so designed that when the frame 71 is in raised position the lower pointed ends 84 of the pins are held up above the top surface of the metal frame 5, while the upper end 85 of the pins 73 is substantially flush with the upper surface 74 of the frame 71 which is substantially level with the bottom edges of the notches 72. As soon, however, as the frame 71 falls, the lower ends 84 of the pins encounter the card through the perforations in the frame and are restrained on the card from further descent. As the frame 71 falls further the upper ends 85 of the pins are caused to project upwardly above the upper surface of the frame 71. These projecting pins are used to limit the outward travel of the carriage. With each printing and punching operation, however, the pin which caused the positioning of the carriage is driven through the paper so that on the next successive operation it will not project and the carriage will be arrested by the next succeeding pin causing the printing to occur upon the next succeeding line. Thus each successive operation causes the printing to occur one line further down upon the card regardless of whether the previous printing has been done in the same ordering unit or in a different one since the line control is in the card itself and not in the machine.

To cause this perforation of the card by the pin, as just described, there is mounted upon the head 16 a square stud 86 in position to rest above the first projecting pin when the carriage has been stopped thereby, and adapted subsequently to enter into the corresponding notch 72 to hold the carriage 10 firmly in position during the printing operation. At the same time, this stud engages the top of the pin and forces the pin downwardly through the card to insure that the next printing operation shall be controlled by the next successive pin. A dog 90 pivoted as at 91 is mounted upon a carriage 10 in the pathway of the projecting ends 85 of the pins 73 and this dog is provided with a stop face 92 adapted to engage at the side of the frame to limit the movement of the dog.

With this construction, it will be clear that as the carriage moves forward the dog is carried over all of those pins which are depressed into the perforations in the card. As soon, however, as a projecting pin is reached, due to the fact that the card has not yet been perforated at that point, the carriage will come to rest and the lug 53 will pass out from beneath the detent 54. It will thus be clear that a continuous movement of the chain will move the carriage outwardly to the position of the first protruding pin at which it will be stopped; as the chain continues to move and the lug travels back on the other stretch of the chain the carriage will be brought back to its original position.

The chain is operated by a gear 93 concentric with the sprocket wheel 51 meshing with a gear 94 and 94a fast upon the shaft 6 and the forward and back movement of the carriage is determined by a mechanism which insures one half rotation of the shaft 6 at the beginning of the cycle of operations then the stoppage of the shaft 6 while the shaft 7 is turning a complete revolution to cause a complete printing movement. Thereafter the shaft 6 completes its revolution to cause the return of the carriage. The dimensions of the gears 93 and 94 and 94a are such that the chain makes one complete movement for each complete rotation of the shaft 6.

The mechanism for controlling the operation of the shafts is as follows (see Fig. 6) :—

Mounted upon the shaft 6 is a cylindrical block 100 having a projection 101 to cooperate with an escapement lever 102 pivoted at 103 to the main frame. This lever 102 is in position to engage the projection 101 to stop the shaft. The lever 102 is urged about its pivot by a spring 104, in a clockwise direction as will be seen in Figure 6 to cause the disengagement of the escapement lever from the projection 101, but the lever is provided with a pin 105 slidable within a recess of the lever and spring pressed outwardly in position when extended to engage a surface 106 of the main frame to prevent this rotation of the lever under the operation of the spring. As soon, however, as the pin 105 is depressed the lever 102 is carried clockwise by the spring 104 to release the projection 101 and permit the rotation of the shaft 6.

A similar projection 108 is similarly situated with regard to an escapement lever 109 which is similarly controlled by a pin 110 under the influence of a spring 111 save only that the projection 108 is timed so that it will encounter the arm of the lever 109 to again stop the rotation of the shaft one half revolution after the projection 101 encountered the lever 102. It will thus be seen that the first half revolution may be caused by the depression of the pin 105 and the second half revolution may be caused by subsequent depression of the pin 110. In each instance the escapement lever is restored to normal position by the engagement of the respective projections with the trailing side of the escapement lever.

The rotation of the shaft 7 is similarly controlled by a block 115 upon the said shaft carrying a projection 116 engaging an escapement lever 117 controlled by a pin 118 and a spring 119 in a manner similar to that previously described for the lever 102. This rotation of the shaft 7 is controlled by the depression of the pin 118.

Arrangements are made whereby the insertion of the card acting through a series of levers will depress the pin 105 to cause the first half rotation of the shaft 6 with the consequent first half movement of the chain and whereby the completion of this half movement will depress pin 118 to cause a complete rotation of the shaft 7 to complete the printing and punching and whereby the completion of the rotation of this shaft 7 will depress the pin 110 to cause the completion of the rotation of the shaft 6 to retract the carriage, transmit the order and restore the parts to normal.

A lever 120 pivoted at 121 to the frame carries a dog 122 in position to be encountered by and to be forced back by the metallic frame 5 when the latter is inserted in the machine. This dog 122 carries a pin 123 riding in a cam surface 124 carried by the framework of the machine and the dog carries at its forward end a tooth 125 in position to engage within a recess 125a to lock the frame in place once it has been inserted therein. This cam 124 is designed to force the tooth 125 to engage the frame. This lever 120 engages a lever 126 which operates through a series of levers and links 127, 128, 129, upon a pivoted dog 130 which is movable in the pathway of the pin 105 and the proportions and arrangements of these levers is such that as the dog 122 is pressed backwardly by the card, the dog 130 depresses the pin 105 to start the rotation of the shaft 6.

A ratchet 131 is carried by a shaft 132 to engage a pin 132a upon the lever 120. This ratchet has a depending arm 133. This ratchet is such that once the dog 122 has been pressed backwardly it cannot again come forward until the ratchet has been released. The depending arm 133 is in the pathway of a lug 134 carried by the chain and this lug is so disposed as to release the ratchet upon completion of the cycle of operations. A gear 136 in mesh with a similar gear 137 upon the shaft 6 carries a stud 138 positioned to engage as the gear 136 rotates an arm 139 of a lever 140 and to rotate the lever against the action of a spring 140a. The other arm of this lever is connected to a bell crank lever 141 having an arm 142 in position to depress the pin 118. It will thus be clear that as soon as the shaft 6 has completed one half revolution and consequently as the gear 136 has completed one half revolution, the pin 118 will become depressed to cause a rotation of the shaft 7.

Th shaft 7 carries a cam 145 having a projection 146 in position to engage a follower roller 147 carried by a lever 148 having an arm 149 in position to depress the pin 110 and the timing of this projection 146 is such as to start the completion of the rotation of the shaft 6 after the shaft 7 has completed its rotation.

With this construction, it will be clear that the insertion of the card will operate the dog 122 to cause the dog 130 to depress the pin 105 to start the shaft 6 but this shaft will be stopped at the end of the half revolution by the projection 108 encountering the lever 109. Meanwhile the rotation referred to has reset the lever 102 and has operated the lever 140 to depress the pin 118 to start the movement of the shaft 7. During the revolution of the shaft 7, the escapement lever 117 is set again to the stop position and the lever 148 is operated by the projection 146 to depress the pin 110 to cause the shaft 6 to make another half revolution until the projection 101 again encounters the lever 102. Thus the machine moves the printing head to the next printing position, then prints and punches the card and then returns to the head and releases the card.

The operation of the machine is designed simultaneously to transmit the order to the serving station. To accomplish this there is provided means whereby the rotation of one of the shafts will transmit a signal impulse to the serving station. For this purpose there is provided upon the shaft 6 an insulated block 151 carrying a contact 152, adapted during the revolution of the shaft to make contact between two spring arms 153 and 154 carried by the frame. These contacts are connected with the serving station in a manner hereinafter described.

Means are provided whereby under certain circumstances the machine will refuse to accept the card. Said circumstances may arise from the fact that some other machine in another dining room is being at the same time operated for the same item. To this end a lever 158 (see Fig. 6) pivoted as at 159 having a face 160 in position to bear against the end of the metallic frame 5 when the latter is inserted. This lever is urged counter clockwise by a spring 161 to bear against a stop 162. This lever has at its lower end a projection 164 in position to engage a shoulder 165 on a lever 166 pivoted as at 167 and under control of a magnet 168. A spring 169 holds the lever 166 with the shoulder 165 normally out of engagement with the projection 164.

The construction is such that under normal conditions the frame as it is inserted in the machine will engage the face 160 and force it backwardly against the action of the spring 161. An actuation of the magnet 168, however, will cause the shoulder 165 to prevent movement of the lever 158 and hence to prevent the frame 5 from being inserted far enough to actuate the dog 122. The lever 166 also carries a roller 170 fitting into the bifurcated end 171 of a bell crank lever 172 pivoted at 173. This lever through the medium of a link 174, lever 175 and link 176 operates a signal 177 to give visual indication that the machine is not in a position to be operated.

The machine is designed also to make record of the person by whom the order is made. To this end the metal frame 5 may carry designation 180 as for example the number of the waiter to whom the frame is given (see Fig. 11) and means are provided for causing this designation or number to be printed upon a tape kept within the machine. The machine is provided (see Fig. 7) with two rolls 181, 182 mounted in the frame. The roll 182 is designed to carry a strip of paper wound onto a roll and the roll 181 is designed to receive this strip after it has passed through the printing mechanism and to wind it and serve as a paper feed. The paper coming from the roll 182 is carried by guide rollers 190, 191, 192, 193 past a platen 194, from thence it is carried over a roller 195 to the roll 181. The guide rollers 190, 191, 192 and 193 are carried upon a lever 200 which is pivoted at 201 in such a position that the platen 194 with the paper before it may be moved into contact with the type upon the end of the frame 5 and may be retracted from the type after the printing is completed.

A link 202 passing over a guide pin 203 is pivoted to the lever 200 at its lower end and serves to control its movements. At its upper end, the lever 200 is provided with an arm 205 connected by a link 206 with an arm 207 carrying a follower roller 208 engaging a cam 209 upon the shaft 7 and a spring 210 holds the roller 208 in engagement with the cam. This cam is so designed as to permit the spring 210 to move the platen 194 into engagement with the type upon the frame 5 during the operation of the shaft 7 but to overcome the operation of the spring 210 and force the platen back by the cam when the printing has been completed. The roll 181 is operated by a ratchet 211 and by movable and stationary pawls 212 and 212a, the movable pawl being carried upon a lever 213 operated by a follower lever 214 under control of a cam 215. This movement of the lever 200 about its pivot serves also to assist in the withdrawal of the paper from the roll 182 so that the take up mechanism on the roll 181 may act upon the strip when it is not under tension.

An inking pad 215a is carried by a lever 216 which is operated through lever 217, link 218, lever 219 by a cam 220 upon the shaft 6. This cam is designed to bring the inking pad into contact with the type upon the end of the frame 5 as the frame is first inserted and thereafter when the cycle of operations has commenced to remove the inking pad from in front of the type before the cam 209 has started to bring the platen 194 toward the type. In this manner it is assured there is always a fresh supply of ink upon the type just before printing is effected. The machine is designed to identify the order with the person who is to receive it and in the embodiment illustrated this is accomplished by issuing at the time of the order a token characteristic of the article ordered. It is preferable that the characteristics of the token by which it is to be distinguished may be of such a nature that the tokens may be mechanically selected for surrender in exchange for the article served. A convenient type of token to employ for this purpose is illustrated in Figure 12 comprising a small slab of brass 221 having perforations 222 therein distributed over its surface in a manner characteristic of the article ordered.

The machine itself is provided with a magazine 225 of such tokens. As illustrated, a pair of circular plates 226, 227 are held in spaced relation by screws 228 distributed around the periphery. Mounted upon the upper plate 226 are a plurality of rectangular members 229 having a cross section conforming to the periphery of the tokens 221 so that each member is adapted to serve as a lateral support for a pile of such tokens. These cylindrical members are concentrically disposed about the center 230 of the plate 226 and each is in registry with an opening in the plate 226 of the same dimensions as the tokens. The space 235 between the plates 226, 227 is just sufficient to receive one of the tokens with ease and within this space 235 there is mounted for rotation about the center 230 a spider 236 having openings corresponding to the openings just described in the plate 226, so that as the spider revolves, its openings come into registry with each of the cylindrical members 229. The under plate 227 has an opening 238 which at one point of the revolution of the spider is in registry with one of the openings of the spider so that as the spider revolves, the opening 238 comes successively in registry with each of the openings in the spider. It will thus be clear that by rotating the spider, each of its openings becomes filled with a token and these tokens are deposited one at a time as they come opposite the opening 238 in the lower plate.

The spider 236 is detachably connected with a turn-table 240 mounted on a lever 241 pivoted concentric with the turn-table and operated by a link 242 from the gear 136. This lever 241 is connected to the turn-table through the medium of a pawl 243 cooperating with a ratchet 244 upon the turn-table while a second pawl 245 fixed to the frame of the machine prevents retrograde movement of the turn-table. The number of teeth in the ratchet 244 and the perforations of the plates is such as to cause the spider 236 to drop one token for each cycle of operations of the machine.

It is desired that each of these independent units shall be operated from a common power supply. To that end there may be provided an electric motor 246 within the casing arranged to drive a vertical shaft 247 for each set of superposed units, through the medium of a horizontal shaft 248. These vertical shafts are arranged to drive two gears for each unit,—one gear on a vertical axis 249 meshes with the gear 8a of the vertical shaft 6, while the other gear 250 on a horizontal shaft meshes with the gear 9a of the horizontal shaft 7. The electrical connections between the unit and the frame may also be made by sliding contacts in any familiar manner. In this way the unit may be removed and replaced from the machine like a drawer and when so replaced, it is ready for operation because the gears slip into mesh of their own accord and the contacts slide into engagement.

As illustrated in Figure 18 there is provided a lever 251 pivoted to the frame work at 252 carrying an insulated contact arm 253 adapted to connect two contacts 254 and 255. This arm 251 carries a roller 256 in the pathway of the slot and is urged in one direction by a spring 257. With this construction as the frame 5 is inserted in the machine it automatically makes contact between the contacts 254 and 255 to prevent the operation of the corresponding unit of any other ordering machine while the frame 5 is still inserted in the unit being described.

To this end the contacts 254 and 255 of one unit, as for example, a unit to order minute steak is connected in series with a battery and with the magnet 168 of an ordering unit in another dining room for a minute steak.

A lever 258 is pivoted to the frame at 258a and carries pivoted to it a pin 259 movable into and out of the pathway of the frame 5 as it is inserted into the slot. This lever 258 is under control of a magnet 260 in such a manner that as the magnet 260 is operated, the pin is thrown into the pathway of the frame to prevent the insertion of the latter. To this end a lever 261 is pivoted to the frame work carrying an armature 262 connected by a link 263 with an arm 264 upon the lever 258. The armature is withdrawn from the magnet by means of a spring 264a. A magnet 265 has its armature carried by an arm 266 which is pressed upwardly by a spring 266a. This arm is arranged in its upper position to interlock with the link 263 when the latter is withdrawn to the left as seen in Figure 18 but is designed to release the link 263 from movement to the right to permit the withdrawal of the pin 259 from the pathway of the frame whenever the magnet 265 is operated. The magnets 260 and 265 are designed to be operated from the serving station in order that the server may prevent the further ordering of commodities which have become exhausted, by actuation of the magnet 260 and may again permit the ordering of those commodities when a new supply has been received, by actuation of the magnet 265.

Means are also provided for preventing the actuation of the machine when the supply of tokens has become exhausted. To this end a weight 267 is placed above the supply of tokens in one of the token receptacles adapted to actuate a lever 268 which actuates a catch 269 through the medium of a link 268a. This catch is designed to restrain a link 269a which is connected to the arm 258 and is operated by a spring 269b, the construction being such that when the tokens are exhausted, the pin 259 will be projected.

The mechanism at the serving station comprises the means for exhibiting a signal to the server that the article has been ordered and means for indicating the number of times the same article has been ordered in succession. This mechanism is preferably provided in duplicate to enable the server to acknowledge orders at the time he starts the preparation thereof and to cancel the record altogether when he has served them all. Thus one of the indicators will show the number of articles which have been ordered and for which he has not yet started preparation while the other dial will indicate the number of articles being prepared and not yet served.

Since moreover the server is charged with all of the articles at the time of delivery to him and is relieved from his obligation only by returning a proper number of designated tokens, there is provided means to enable him automatically to select the token to be surrendered to him so that he may know at once if he has received the proper token or not and to coordinate the number so received and identified, with the orders.

Moreover, since it is desirable that the surrender of the article shall depend upon the receipt of the proper token, the mechanism is arranged to delete the second record automatically by means of the appropriate token, by a token selecting mechanism adapted to reject improper tokens.

In the embodiment illustrated (see Fig. 1) there is provided a serving table 269a,— within which are located the token identifying means and the operating mechanism therefore and above which are arranged the annunciators and signals.

As has previously been described the token is provided with perforations positioned in a group formation which is characteristic of the commodity and the token identifying means comprises generally a member having pins thereon having the same characteristic group formation. To identify the token it is brought into contact with the token identifying member whereupon if it be the proper token the pins upon the member may enter the perforations in the token and as a consequence thereof set back one of the serving dials one step and also make arrangements to divert the token into a locked compartment. If, however, the token be the wrong token so that the characteristic group formations of the pins and token perforations do not correspond, the pins cannot enter the perforations to set back the dial and the mechanism itself changes the routing of the token to cause the token to be rejected from the machine.

As illustrated there is provided in the serving table 269a a slot 270 which is in registry with a corresponding passageway 271 within the mechanism. This slot and passageway are of suitable dimensions to receive the token and the pasageway comprises grooves adapted to engage the side edges of the token. This passageway 271 discharges into either one of two passageways 272 or 273, the former of which diverts improper tokens into an outside receptacle 274 and the latter of which diverts the proper tokens into a locked compartment 275. The token is diverted from one to the other of these by a gate member 276 pivoted at 277 which is under the control of token identifying means 278.

The token as it is inserted in the machine encounters a carrier 280 the function of which is to engage the token and carry it through the machine. It is adapted to release the token identifying means 278 for token identifying operation after the token has been inserted, and to hold the token in position to be identified. It also engages the token to prevent the withdrawal thereof after the insertion.

The carrier 280 is constrained in its movement by reason of the fact that it carries two pins 281 and 282 constrained to move in slots 283 and 284 respectively. The slot 283 is closed at both its ends but the slot 284 is open at both ends for a purpose to be hereafter described and this is accomplished by forming one of its side walls in the form of a guide member 285 of less length than the length of the slot. The carrier 280 is pivoted to a link 286 having an outstanding arm 287 which is connected to the link by a spring 288 adapted to urge the carrier to rotation about the pin 281 in a clockwise direction when such rotation is permitted by the slot 284.

This carrier has a C shape nose at one corner as shown at 289 thus providing a shoulder 290 in the pathway of the token adapted to be engaged by the lower end of the token as the latter is depressed and also providing above the shoulder a point 291 which may be moved into a perforation 292 in the token by rotating the carrier 280 during the initial stages of the depression of the carrier to retain the token in place. At the end of the movement of the carrier the carrier is again rotated, but in the reverse direction, to withdraw the point from engagement with the perforation and withdraw the shoulder from beneath the token to permit the token to fall. To accomplish this result the slot 284 is provided at both top and bottom with outwardly inclined walls 293 and 294 to engage the pin 282 and lead the pin into the slot again at the top and force it outwardly at the bottom. On the return upward travel of the carrier the pin 282 travels on the outside of the guide member 285 and means are provided for again forcing it back into the slot 284 at the top of the movement.

The link 286 is carried at the outward end of a lever 295 pivoted as at 296. This lever 295 has an arcuate periphery 297 carrying gear teeth 298 in mesh with corresponding teeth 299 upon a gear segment 300 pivoted as at 301. This gear segment has a rearwardly extending arm 302 carrying a friction roller 303 in engagement with a cam surface 304 carried by a cam shaft 305. The lever 295 is under control of a spring 306 carried by an extension 307 so designed that during the initial portion of the movement of the lever, the spring passes the dead center and during the latter portion of the movement may actively operate, when permitted to do so to draw the token downwardly through the machine.

This construction is such that during the insertion of the token the lever 295 is first rotated by the token until the token reaches the token identifying position. Thereafter on rotation of the shaft 305 the token is carried through the machine by the spring 306 to be discharged at the bottom; thereafter as the shaft 305 completes its revolution, the cam 304 returns the carrier 280 to its original position.

An arm 315 pivoted as at 316 carries a stop shoulder 317 adapted to engage a screw 318 upon the lever arm 295 to limit the downward movement of the carrier 280. This is for the purpose of holding the token in identifying position to give an opportunity for the operation of the identifying mechanism. As soon as the identification is completed the stop 317 is moved out of the way by another lever arm 319 which is rigidly attached to it and which is connected to a bell crank arm 320 by a link 321. This bell crank arm 320 has a roller 322 under control of a cam 323 upon the shaft 305. A spring 325 is arranged to hold the stop arm 317 normally in the path of the screw 318 and retain the follower roller 322 in contact with its cam 323.

The token identifying means 278 comprises a plate 330 carrying pins 331 in the characteristic group formation chosen for the particular commodity. This plate is detachably carried by a head 332 slidably mounted upon pins 333 which are supported in the machine frame. This slidable mounting is such as to permit the head to move laterally in the direction of extension of the pins 331 toward and away from the face of the token. The head 332 carries a slotted post 340 which is connected by a pin 341 with one arm 342 of a bell crank lever pivoted at 343. The other arm 344 of this bell crank lever carries a roller 345 in position to cooperate with a cam 346 upon the shaft 305 and this arm 344 is urged downwardly by a spring 347 to urge the roller toward the cam and thereby urge the pin 331 toward the token. The cam surface is such however, that at certain portions of the revolution of the shaft 305 the pins 331 will be withdrawn from the token and held out of contact therewith while at other portions of the revolution the arm is free to follow the urging of the spring 347 to bring the pins 331 into engagement with the token.

The arm 344 has an extension 350 in position to cooperate with a stop 351 carried by the gear segment 300 when the latter is in its position of rest before the token has been inserted in the slot but this stop 351 is so positioned that the insertion of the token and its depression to the point where it comes to rest to be identified will bring the stop 351 out of engagement with the extension 350. The purpose of this extension 350 and stop 351 is to prevent the operation of the token identifying means when no token is in the machine.

The operation of the arm 342 by the spring 347 will move the pins toward the token. If the pin group formation corresponds to the group formation of the perforations in the token, the pins pass clear through the token and permit the maximum travel of the arm 342. But if the pin conformation does not so correspond, the movement of the arm 342 is limited by the engagement of the end of the pin with the token. This minimum travel is insufficient to set back the dial or to operate the gate 276 but the maximum travel is sufficient to effect both these results.

Mounted upon the frame but electrically insulated from each other is a pair of spring contact arms 360, 361 in position to be engaged by a projection 362 upon the arm 342 before it completes its complete movement. A lever 370 pivoted at 371 to the frame has one arm pivoted to the lever 342 at 372 while the other arm is connected at 373 with a link 374 which is pivoted at 375 to the gate 276. With this construction when the arm 342 moves with its maximum travel the gate 276 is reversed in position from the position shown in the figure.

A spring 376 holds the gate normally in the position shown in the figure in which it discharges tokens into the receptacle 274. The movement of the token identifying means permitted by the cam 346 is however, a momentary one and it is desirable that the gate 276 remain in position after this momentary movement has ceased. The link 374 is therefore at 375 connected to the gate by a pin and slot connection and stop means are provided for holding the gate in the reverse position once it has reached that position and for again releasing it when the operation has been completed.

As illustrated there is provided upon the gate a member 377 having at one end a notch 378 cooperating with a pin 379 to limit the movement of the gate in both directions. This member 377 has at its other end a projection 380 adapted to pass beneath a shoulder 381 upon a bent lever 382 pivoted at 383. This bent lever has upon its other arm 384 a cam surface 385 adapted to cooperate with a pin 386 carried upon a plate 387 upon the shaft 305. When the arm 342 makes an initial movement in response to a properly identified token, the gate 276 is reversed in position and the projection 380 passes beneath the shoulder 381 by which it is held. The gate remains in this position until the completion of the rotation of the shaft 305 which releases the gate by bringing the pin 386 into contact with the cam surface 385, permitting the spring 376 to return the gate to its first position. The lever 382 is operated by a spring 388.

It has been mentioned that the pin 282 passes upwardly outside of the guide 285 where it is held outwardly by the spring 288. To again force it into the slot 284, there is provided a block 389 slidable within guides in the frame controlled by an arm 390 to which it is connected by a pin and slot movement 391. This arm 390 is operated by a pin 392 engaged by a projection 393 carried by the shaft 316. A spring pressed arm 394 pivoted as at 395 has ratchet teeth 396 engaging a pin 397 upon the lever 295 to prevent the backward movement of that lever once its downward movement has been started, until the token has been completely inserted and the shaft 305 has been operated.

This arm 394 is releasable by an arm 398 rigidly connected thereto adapted to be engaged by the link 321 as the latter rises in response to its operating cam.

Means are provided for preventing the insertion of a second token before the cycle of operations is completed and to this end there is provided a gate 399 comprising a flat plate slidable over the entrance of the slot 270 this gate being operated by an arm 400 pivoted at 401 and having a cam surface 402 adapted to be engaged by a roller upon the pin 282 at the extreme of its upper travel. A spring 404 tends to urge the gate to closed position and the cam surface is such that the roller 405 will withdraw the gate to open the slot.

The arrangement of cams upon the shaft 305 is such that at the position of rest of the shaft, that is the position the shaft assumes between operations, the roller 345 is resting upon the upper portion of its cam surface holding the pins 331 out of the pathway of the tokens. At this time the stop 317 is in the pathway of the screw 318 and the gate 276 is in position to discharge the tokens into the receptacle 274. Should the shaft 305 be operated without the presence of a token, the token identifying means cannot operate because the stop 351 prevents the depression of the projection.

If a token be inserted and depressed it will carry with it the carrier 280 which through the connected train of mechanism will disengage the stop 351 from the projection 350, at the same time the token is held in depressed position by reason of the engagement of the ratchet teeth 396 with the pin 397. As soon, therefore, as the shaft 305 is rotated by a mechanism hereafter to be described the roller 345 passes off of the high portion of the cam into its depression permitting the pins 331 to pass toward the token. If the token be the proper one, the pins pass through it and the completion of the movement of the arm 342 shifts the gate 276 in the manner hereinafter described and makes contact between the arms 360 and 361. A further rotation of the shaft 305 immediately withdraws the pins from the token by causing the roller 345 to rise up on to the upper portion of the cam again. This breaks the contact at 360 and 361 but does not reverse the position of the gate by reason of the fact that the shoulder 381 has engaged the stop 380. A further rotation of the shaft now operates the cam 323 to remove the projection 317 from the pathway of the stop 318 thereby permitting the spring 288 to draw the token downwardly through the slot. As soon as this downward withdrawal has reached the point where the roller 282 engages the inclined portion 294 the token is released and by reason of the position of the gate 276, the token falls into the locked compartment.

At this time the roller 303, engaging a high portion of its cam, brings the carrier 280 upwardly to its initial position and the ratchet arm 394 and the arm 315 are restored to their initial positions.

The shaft 410 may be operated from a foot treadle 406 by a mechanism which insures one complete revolution with each depression of the pedal and which also assures that once the depression is started it will be completed before another movement can be initiated. To this the treadle 406 is connected by a link 407 with a gear segment 408 meshing with the pinion 409 upon a shaft 410 which shaft also carries a gear segment 411 meshing with a pinion 412 loose upon the shaft 305. This pinion 412 may be connected to the shaft 305 by any convenient ratchet mechanism which will engage the shaft only at one point in its revolution and a pawl 413 is adapted to prevent retro-grade motion of the shaft. The lever and gear ratios between the pedal 406 and the pinion 412 are such as to cause the pinion to move slightly in excess of one revolution with each depression of the pedal. A spring 414 normally supports the treadle and returns it to its upper position and a stop 415 gives an adjustable limit to its travel.

The operation of the mechanism just described will be evident from the description. When the token is first placed in the slot 270 and depressed it automatically moves the stop 351 from its normal position obstructing the movement of the projection 350. The lever 344 cannot move however because of the engagement of the roller 345 with the cam 346. Moreover, the token cannot be further depressed or carried outward by the machine because of the stop 317. As soon as, however, the foot treadle is depressed and the shaft 305 is rotated thereby, the token identifying means is carried toward the token and if the token be the proper one this movement is sufficient to make contact between the arms 360 and 361 and to operate the gate 276. The token identifying means is immediately withdrawn by its operating cam but the gate remains in its new position because of the shoulder 381.

As soon as the token identifying means has been retracted the further rotation of the shaft 305 withdraws the stop 317 to permit the token to complete its descent. At the completion of this movement the token is released from the carrier 280 and it falls into the locked compartment. This movement of withdrawing of the stop 317 also moves the ratchet arm 394 from its obstructing position. A further rotation of the shaft 305 now returns the carrier 280 to its initial position in the course of which the pin 282 travels on the outside of the member 285 and when it gets to the top of its travel it is restored to its inner slot by means of the slide 389.

Figure 22:
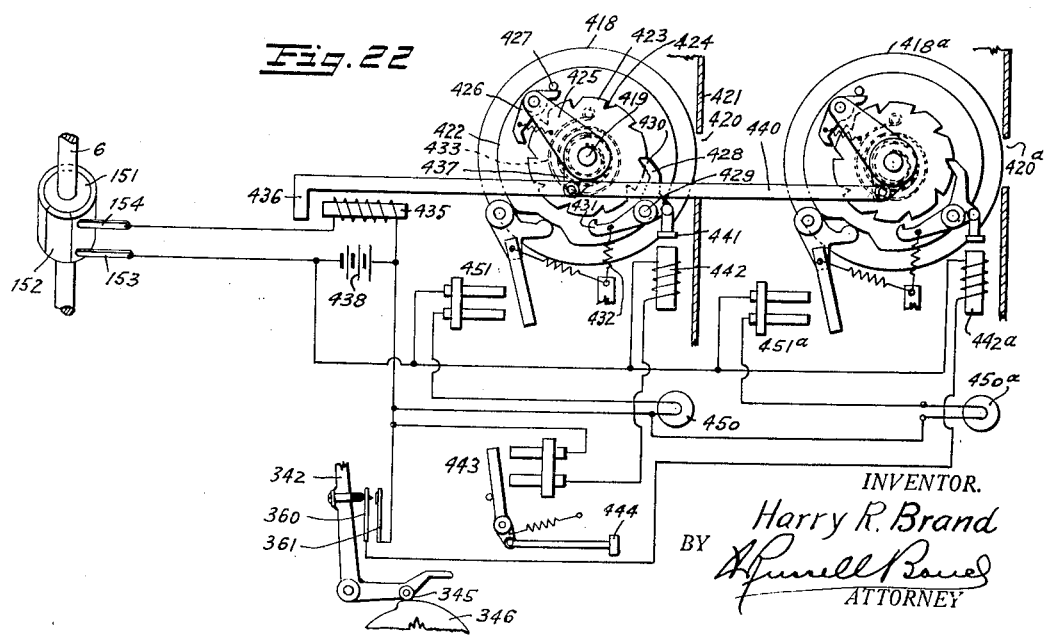
Figure 22 is a diagrammatic view showing the indicating and signal mechanism.

The signal system is illustrated diagrammatically in Figure 22. This figure is diagrammatic only in that the two signal systems are shown side by side in the same plane for convenience of illustration of the operating mechanism whereas in fact they are in the other figures of the drawings disposed co-axially and for this purpose a diagrammatic connection is made between them. The system comprises primarily two indicator dials each with a related signal light. Since these may be made identical in construction only one of them need be described in detail.

A cylindrical drum 418 is mounted for rotation upon a shaft 419 supported by the frame work. This drum carries upon its periphery a series of numbers 1, 2, 3, 4 etc. in position to be exhibited one at a time through a window 420 in the frame 421. Attached to the drum is a cam plate 422 and a ratchet plate 423. The ratchet plate preferably has a number of notches in it as shown at 424 spaced apart angularly the same as the numbers upon the periphery of the drum. An arm 425 loosely mounted upon the shaft 419 carries a spring pressed pawl 426 in position to engage in the notches of the ratchet while a pin 427 is arranged to strike the pawl and withdraw it from the notches at the extreme of its travel in one direction. An escapement lever 428 is pivoted to the frame at 429 in position to have its arms 430 and 431 engage in the notches of the ratchet. A spring 432 urges the escapement lever arm 430 into engagement with the ratchet and permits it thus to serve as a pawl to prevent backward movement of the ratchet except under control of the pawl. A spring 433 connects the drum to the frame work to bring the drum to its zero position whenever permitted to do so.

With the construction above described it will be seen that as the arm 425 is oscillated through the angular distance of one notch that the drum will be advanced by the pawl 426 and held in position by the arm 430. The mechanical oscillation, however, of the escapement 428 will allow the drum to be forced backward by the spring 433 notch by notch.

The oscillation of the arm 425 just described is accomplished by a magnet 435 operated upon an armature 436 connected to a depending arm 437 on the arm 425. This magnet is operated from a battery 438, when the circuit is closed between the contacts 153 and 154 by the rotation of the circular block 151 mounted upon the shaft 6 of the ordering machine.

Upon the drawings there is illustrated a link 440 connecting the diagrammatic illustration of one dial with that of the other in order to effect a mechanical connection between them. This type of connection will of course not be employed where the two drums are mounted upon a common axis but the member 440 may be conventionally regarded as any mechanism for causing the magnet 435 to operate both dials. It will be obvious that a separate operating mechanism may be employed for each dial connected to the common circuit. Insofar as is necessary to refer to them in detail the parts of the right hand dial as seen in this figure will be referred to by the same reference character as those in the left hand dial but with the addition of the subscript "a".

An escapement lever 428 carries an armature 441 cooperating with a magnet 442 and this magnet is in control of a hand switch 443 which is adapted to throw it in circuit with the battery 437. As the button 444 is depressed the drum 418 will be stepped back one number at a time to return to its initial position. This button is used by the serving man as for example the chef to acknowledge the number of orders at the time he starts to prepare them for service and since he must press the button once for each number, it creates in his mind a sensory impression of the number of orders to be prepared, which reenforces and supplements his previous visual perception from the indicator. This also enables him to acknowledge and start to prepare a smaller number of orders than the indicator shows without destroying the record of the orders still to be prepared.

The magnet 442—a of the right hand dial is under control of the switch comprising the spring contact arms 360 and 361 upon the token selecting mechanism so that this dial is stepped back once for each time that a properly selected token passes through the token machine. The dial thus indicates at all times the number of orders placed for which the cook has not as yet received the proper tokens. Each of the signal mechanisms is provided with a signal light 450 and this light is controlled by a switch 451 operated by a cam 422 and this cam is so designed that the signal light is burning at all times except when the drum 418 is at rest in its initial position. It is desirable that one of these signal lights be a different color than the other so that the chef or serving man may readily notice when new orders have been placed which he has not yet started to prepare.

The totalizer is herein illustrated diagrammatically only, its more complete construction being fully illustrated in my said copending application. Its details do not enter into the combinations claimed herein, in respect to which it may comprise any mechanism responsive to the perforations in the card for summing up the totals of the checks and for printing that total upon the checks and recording it within the machine.

With the above construction, the operation of the device should be clear. The waiter may take the order from the guest in any convenient manner either by word of mouth or by making a pencil memorandum thereof on the back of the check. Since this memorandum is for his own use only, it may be taken in the waiter's native language or in any form intelligible to him.

The waiter approaches the order machine and selects the unit corresponding to the first item ordered and inserts the framework carrying the card into the machine. This starts the train of mechanism operating as has been described, printing the item upon the card, transmitting the order to the cook or server in duplicate and makes a record within the ordering machine of the number of the waiter responsible for the order. It also perforates the card for subsequent operation of the totalizer and perforates the margin of the card to secure the proper positioning of the printing mechanism should a subsequent order be made. At the same time the machine ejects a token corresponding to the article ordered. The machine then rejects the frame. The waiter now successively inserts the frame in the units corresponding to the next items on the bill of fare until the entire order has been placed. During the preparation of the order the waiter's time is free to attend to other guests or to the setting of the table. In the meantime there has appeared upon the cook's indicator two signal lights and the two dials have each been advanced one number for each item ordered. The cook glancing at the dial notices the number of articles ordered and presses the hand switch to set back one dial and to extinguish its light. The number of times he is compelled to press the switch to extinguish the light furnishes a check upon his visual memory of the number of orders which he is to prepare. Should it be inconvenient for him to start the preparation of as many articles as the indicator demands, he may press the switch a less number of times and prepare the number of orders corresponding to the number of times he presses the switch thus automatically keeping track of the orders for which he has still to start the preparation.

As soon as the waiter is ready to serve an article he goes to the kitchen and presents the proper token to the chef. The chef then inserts the token in the slot 270 and if the token is received by the slot and operates the machine, it is evidence that the proper token has been received. Since this token now locked within the machine is a receipt to the chef for the article, the chef may now deliver the article itself to the waiter knowing that it has been properly ordered and that the waiter is the person authorized to receive it. This insertion of the token automatically sets back the remaining dial one step so that that dial indicates at all times the orders which are still to be served.

The waiter may now deliver the article to the customer and since the completed order is now automatically, by the mechanism itself, charged against the waiter, the waiter to discharge his responsibility must see that payment is received from the guest. He, therefore, takes the frame 5 to the totalizing machine which, actuated by the perforation in the card, sums up the amount to be paid and prints the sum upon the lower end of the card, at the same time adding that to the total within the machine. The totalizer, therefore, not only assists the waiter in determining the amount to be received from the customer but also furnishes a check upon the cashier, since the net accumulated total within the totalizer is the amount of money which the cashier must account for after all checks are paid.

With the above system it will be clear that the entire personnel is under absolute control. The waiter can make no order without making a permanent record thereof chargeable to him. The cook may now with this system be charged with the food when it is delivered to him because the machine automatically credits him with the food delivered by him to the waiter. It is thus possible to furnish a complete check upon the cook, which has not heretofore been possible. The cashier herself is responsible for the entire sum carried by the totalizing machine which corresponds to the sum total of all of the items ordered.

Not only, however, does the system furnish a complete check so that there can be no possibility of undetected theft or error but moreover this system greatly facilitates the service. It is no longer necessary or desirable that the waiter make the trip to the kitchen to place the order with the resulting loss of his time and increased confusion in the kitchen and possibility of error due to hastily shouted verbal orders. Moreover, the machine furnishes automatically a complete analysis of all sales from the dining room.

Should the supply of any given article run out, the cook may actuate the magnet 260 to prevent the further insertion of the frames 5 in the unit and when the new supply of tokens has been received, may actuate the magnet 265 to again restore the unit to operative condition.

Means are also provided for accumulating within the machine the number of orders actually placed by the machine for each commodity. This mechanism is so arranged as to be operated only when the ordering mechanism is actually operated. To this end there may be mounted adjacent to the gear 136, a lever 470 having an arm 471 in the pathway of the pin 138 and this lever is urged in one direction by a spring 472 and is moved in the other direction by a pin contrary to the action of the spring. This lever 470 is connected by a link 473, a lever 474 and a link 475 with a counter 476 which is in position to be visible from the front of the machine.

Since certain changes in carrying out the above process and in the constructions set forth, which embody the invention may be made without departing from its scope, it is intended that all matter contained in the above description or shown in the accompanying drawings shall be interpreted as illustrative and not in a limiting sense.

I claim:

1. The process of dispensing which comprises performing a mechanical act initiatory of the delivery of an article from a distant point and thereby recording the order at the distant point, automatically identifying a recipient wtih the order and surrendering the article to the recipient in exchange for the identification and deleting the record by surrender of the identification.

2. The process of dispensing which comprises mechanically ordering an article from a distant point and thereby recording the order at a distant point and automatically identifying a recipient with the order and surrendering an article to the recipient in exchange for the identification and deleting the record by surrender of the identification.

3. The process of dispensing which comprises printing the name and price of an article upon a sales check and thereby automatically ordering the article from a distant point and recording the order at a distant point and automatically identifying a recipient with the order and surrendering the article to the recipient in exchange for the identification and deleting the record by surrender of the identification.

4. The process of dispensing which comprises mechanically ordering an article from a distant point and thereby automatically issuing an article identifying token having mechanical token selective characteristics and surrendering the article in exchange for the token and mechanically selecting the token for surrender by said characteristics.

5. The process of dispensing which comprises mechanically ordering an article from a distant point and thereby recording the order at a distant point and automatically issuing an article identifying token having mechanical token selective characteristics and surrendering the article in exchange for the token and deleting the record by surrender of the token and mechanically selecting the token for surrender by said characteristics.

6. The process of dispensing which comprises mechanically ordering an article for subsequent delivery at a distant point; identifying the order with the particular article for delivery, recording the actuation of the ordering mechanism and releasing the article by surrendering the identification.

7. The process of dispensing which comprises mechanically ordering an article for subsequent delivery at a distant point identifying the order with the particular article for delivery, and with the person making the order, recording the ordering, recording the identification of the person placing the order and releasing the article by surrendering the identification.

8. The process of dispensing which comprises mechanically ordering an article from a distant point and thereby creating physical alteration in a check to correspond to the sales amount of said article and also automatically issuing an article identifying token having mechanical token selective characteristics and surrendering an article in exchange for the token and mechanically selecting the token for surrender by said characteristics and subsequently mechanically totaling the check by said alterations and automatically totaling all of said totals.

9. The process of dispensing which comprises mechanically ordering an article from a distant point and thereby creating physical alteration in a check to correspond to the sales amount of said article and also recording the order at a distant point and automatically issuing an article identifying token having mechanical token selective characteristics and surrendering the article in exchange for the token and deleting the record by surrender of the token and mechanically selecting the token for surrender by said characteristics and subsequently mechanically totaling the check by said alterations and automatically totaling all of said totals.

In testimony whereof, I have signed this specification.

HARRY RUSSELL BRAND.